United States Patent
Jang

(10) Patent No.: US 12,253,739 B2
(45) Date of Patent: Mar. 18, 2025

(54) LENS DRIVING APPARATUS AND CAMERA MODULE COMPRISING SAME

(71) Applicant: LG INNOTEK CO., LTD., Seoul (KR)

(72) Inventor: Young Bae Jang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 985 days.

(21) Appl. No.: 16/982,189

(22) PCT Filed: Apr. 10, 2019

(86) PCT No.: PCT/KR2019/004278
§ 371 (c)(1),
(2) Date: Sep. 18, 2020

(87) PCT Pub. No.: WO2019/199054
PCT Pub. Date: Oct. 17, 2019

(65) Prior Publication Data
US 2021/0026098 A1    Jan. 28, 2021

(30) Foreign Application Priority Data

Apr. 11, 2018 (KR) .......................... 10-2018-0042061

(51) Int. Cl.
*G02B 7/09* (2021.01)
*G02B 7/02* (2021.01)
(Continued)

(52) U.S. Cl.
CPC .............. *G02B 7/09* (2013.01); *G02B 7/021* (2013.01); *G02B 27/646* (2013.01); *G03B 5/00* (2013.01);
(Continued)

(58) Field of Classification Search
CPC . G02B 7/09; G02B 7/08; G02B 7/021; G02B 7/102; G02B 27/646;
(Continued)

(56) References Cited

U.S. PATENT DOCUMENTS

| 2007/0154198 A1* | 7/2007 | Oh .......................... H04N 23/67 396/85 |
| 2007/0206934 A1* | 9/2007 | Ishii ................... H04N 23/6812 348/E5.046 |

(Continued)

FOREIGN PATENT DOCUMENTS

| CN | 106054346 A | 10/2016 |
| JP | 8-248293 A | 9/1996 |

(Continued)

OTHER PUBLICATIONS

Machine translation of JP 2015125441 retrieved electronically from Espacenet Aug. 28, 2023 (Year: 2023).*

(Continued)

*Primary Examiner* — Cara E Rakowski
(74) *Attorney, Agent, or Firm* — Birch, Stewart, Kolasch & Birch, LLP

(57) ABSTRACT

A lens driving apparatus and a camera module comprising same are provided. A lens driving apparatus according to an aspect of the present invention comprises: a base including a hole; a first bobbin arranged in the base; a second bobbin arranged in the base and spaced apart from the first bobbin; a first coil arranged on the first bobbin; a second coil arranged on the second bobbin; a driving magnet fixed to the base and facing the first and second coils; a first flexible printed circuit board (FPCB) having one end electrically connected to the first coil and the other end passing through the hole in the base; and a second FPCB having one end electrically connected to the second coil and the other end passing through the hole in the base.

17 Claims, 3 Drawing Sheets

(51) Int. Cl.
*G02B 27/64* (2006.01)
*G03B 5/00* (2021.01)
*G03B 13/36* (2021.01)

(52) U.S. Cl.
CPC ...... *G03B 13/36* (2013.01); *G03B 2205/0007* (2013.01)

(58) Field of Classification Search
CPC .. G02B 13/0065; G02B 13/007; G03B 13/36; G03B 2205/0007; G03B 2205/0069
See application file for complete search history.

(56) References Cited

U.S. PATENT DOCUMENTS

| | | | | |
|---|---|---|---|---|
| 2009/0161231 A1* | 6/2009 | Shiraki | ................ | G02B 7/102 359/697 |
| 2010/0067124 A1* | 3/2010 | Nishikawa | ............. | G02B 7/102 359/738 |
| 2012/0307365 A1* | 12/2012 | Lee | ........................ | G02B 7/102 359/554 |
| 2013/0194490 A1* | 8/2013 | Okuyama | ................ | G02B 7/08 348/374 |
| 2013/0195438 A1* | 8/2013 | Hase | ........................ | G03B 3/00 396/529 |
| 2016/0187671 A1* | 6/2016 | Park | ........................ | G02B 7/08 359/557 |

FOREIGN PATENT DOCUMENTS

| | | |
|---|---|---|
| JP | 2000-147350 A | 5/2000 |
| JP | 2003-75708 A | 3/2003 |
| JP | 2008-259111 A | 9/2006 |
| JP | 2010-191331 A | 9/2010 |
| JP | 2011-66580 A | 3/2011 |
| JP | 2015-125441 A | 7/2015 |
| KR | 10-2017-0045552 A | 4/2017 |
| WO | WO 2013/171811 A1 | 11/2013 |

OTHER PUBLICATIONS

Machine translation of JP 2010191331 retrieved electronically from Espacent Aug. 29, 2023 (Year: 2023).*

* cited by examiner

LENS DRIVING APPARATUS AND CAMERA MODULE COMPRISING SAME

CROSS REFERENCE TO RELATED APPLICATIONS

This application is the National Phase of PCT/KR2019/004278 filed on Apr. 10, 2019, which claims priority under 35 U.S.C. § 119 (a) to Patent Application No. 10-2018-0042061 filed in the Republic of Korea on Apr. 11, 2018, all of which are hereby expressly incorporated by reference into the present application.

TECHNICAL FIELD

The present invention relates to a lens driving device and a camera module comprising the same.

BACKGROUND ART

The content described below provides background information for the present embodiment, but does not describe the prior art.

As the spread of various mobile terminals is widely generalized and wireless Internet services are commercialized, the demands of consumers related to the mobile terminals are also diversified, and various types of additional devices are mounted on the mobile terminals.

A representative one is a camera module that photographs a subject as a photo or video. Meanwhile, an auto focus function is being applied to a recent camera module to automatically adjust focus according to a distance of a subject. In addition, an image stabilization function that prevents an image from shaking caused by the hand shaking of a photographer has been applied. In addition, a zoom function is applied to photograph a distant subject.

However, as various functions are equipped, interference may occur between various driving devices.

DETAILED DESCRIPTION OF THE INVENTION

Technical Subject

The problem to be solved by the present invention is to provide a lens driving device capable of preventing interference that may occur between driving apparatuses and a camera module comprising the same.

Technical Solution

A lens driving device according to one aspect of the present invention for achieving the above object comprises: a base comprising a hole; a first bobbin disposed in the base; a second bobbin disposed in the base and spaced apart from the first bobbin; a first coil disposed on the first bobbin; a second coil disposed on the second bobbin; a driving magnet fixed to the base and facing the first and second coils; a first flexible printed circuit board (FPCB) having one end electrically connected to the first coil and the other end passing through the hole of the base; and a second flexible printed circuit board with one end electrically connected to the second coil and the other end passing through the hole of the base.

In addition, it may further comprise a shaft, connected to the base, wherein the first bobbin and the second bobbin are being slid.

In addition, the base may be formed in a shape corresponding to a portion of the first and second bobbins, and may comprise a guide portion which is in contact with a portion of the first and second bobbins and guiding the movement of the bobbin.

In addition, the hole of the base may comprise a tapered surface that becomes wider as it travels toward the inside of the base.

In addition, when the first bobbin and the second bobbin are getting away from each other, the first flexible printed circuit board and the second flexible printed circuit board may be in contact with the tapered surface.

In addition, the base may comprise a first stopper that limits the movement of the first bobbin that is formed to be protruded from an area adjacent to one end of the driving magnet, and a second stopper that is formed to be protruded from an area adjacent to the other end of the driving magnet to limit the movement of the second bobbin.

Further, the length of the driving magnet in the optical axis direction may be greater than the sum of the length of the first bobbin and the length of the second bobbin.

Further, the first coil may be wound along the outer circumferential surface of the first bobbin, and the second coil may be wound along the outer circumferential surface of the second bobbin.

In addition, each of the first bobbin and the second bobbin may comprise a groove in which the shaft is disposed.

In addition, the first bobbin and the second bobbin may be moved in different directions from each other.

In addition, the first flexible printed circuit board comprises a first connection portion formed to be extended from one end of the first flexible printed circuit board, and a second connection portion formed to be extended from the other end of the first flexible printed circuit board, and the second flexible printed circuit board comprises a third connection portion formed to be extended from one end of the second flexible printed circuit board, and a fourth connection portion formed to be extended from the other end of the second flexible printed circuit board, wherein when the first bobbin and the second bobbin are getting close (to each other), the angle formed by the first connection portion and the second connection portion may be 90 degrees, and the angle formed by the third connection portion and the fourth connection portion may be 90 degrees.

In addition, when the first bobbin and the second bobbin are getting close (to each other), the other end of the first flexible printed circuit board and the other end of the second flexible printed circuit board may be in contact with the outer side surface of the base.

In addition, when the first bobbin and the second bobbin are getting closer (to each other), the second connection portion and the fourth connection portion may be in contact with each other.

In addition, when the first bobbin and the second bobbin are being spaced apart, the length of the driving magnet may be greater than the sum of the separated distance between the first bobbin and the second bobbin and the lengths of the first and second coils.

In addition, it may further comprise a position detection sensor disposed on the first flexible printed circuit board and the second flexible printed circuit board.

A camera module according to one aspect of the present invention for achieving the above object comprises: a base comprising a hole; a first bobbin disposed in the base; a second bobbin disposed in the base and spaced apart from the first bobbin; a first lens module disposed in the first bobbin; a second lens module disposed in the second bobbin; a first coil disposed on the first bobbin; a second coil disposed on the second bobbin; a driving magnet fixed to the base and facing the first coil and the second coil; a first flexible printed circuit board (FPCB) having one end electrically connected to the first coil and the other end passing through the hole of the base; and a second flexible printed circuit board with one end electrically connected to the second coil and the other end passing through the hole of the base.

Advantageous Effects

Through the present embodiment, a lens driving device capable of preventing the interference that may occur between driving apparatuses and a camera module comprising the same can be provided.

BEST MODE

Figure 1:
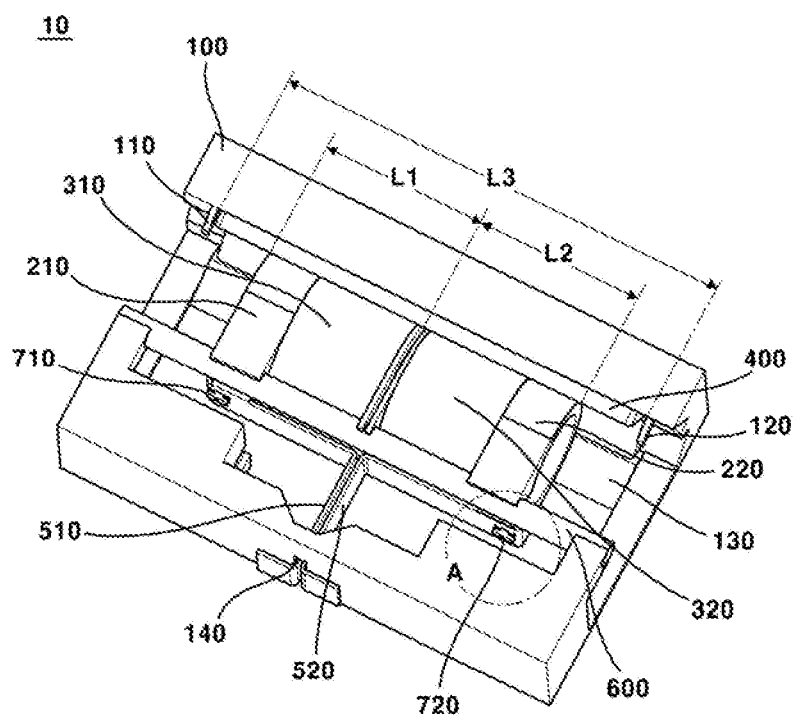
FIG. 1 is a perspective view of a lens driving device according to an embodiment of the present invention.

Hereinafter, exemplary embodiments of the present invention will be described in detail with reference to the accompanying drawings. Advantages and features of the present invention, and methods for achieving them will be apparent with reference to the exemplary embodiments described below in detail in conjunction with the accompanying drawings. However, the present invention is not limited to the exemplary embodiments disclosed below, but may be implemented in various different forms, and the present exemplary embodiments are merely provided to complete the disclosure of the present invention and to fully inform the scope of the invention to those skilled in the art to which the present invention belongs, and the present invention will be merely defined by the scope of the claims. Like refer to like elements throughout. Throughout the specification, the same reference numeral refers to the same component.

Unless otherwise defined, all terms (comprising technical and scientific terms) used in the present specification may be used in a meaning that can be commonly understood by those skilled in the art to which the present invention belongs. In addition, terms that are defined in commonly used dictionaries are not ideally or excessively interpreted unless they are specifically defined clearly.

In addition, the terms used in the exemplary embodiments of the present invention are intended to describe the exemplary embodiments and are not intended to limit the present invention. In this specification, the singular may also include the plural unless specifically stated in the text. As used in this specification, 'comprises' and/or 'comprising' means not to exclude the presence or addition of one or more other components, steps, and/or operations In addition to the components, steps, and/or operations mentioned. And "and/or" includes each and all combinations of one or more of the items mentioned.

In addition, in describing the components of the exemplary embodiment of the present invention, terms such as first, second, A, B, (a), and (b) may be used. These terms are merely intended to distinguish the components from other components, and the terms do not limit the nature, order or sequence of the components. When a component is described as being 'connected', 'coupled' or 'jointed' to another component, the component may be directly connected, coupled or jointed to the another component, but it should be also understood that yet another component may be 'connected', 'coupled' or 'jointed' between the component and the another component.

'Optical axis direction' used below is defined as the optical axis direction of the lens coupled to the lens drive device. Meanwhile, the 'optical axis direction' may correspond to the 'up and down' direction and the 'z axis direction'.

The "auto focus function" used below is defined as the function that automatically focuses on a subject by moving the lens in the direction of the optical axis according to the distance of the subject so that clear images of the subject can be obtained on the image sensor. Meanwhile, 'auto focus' can be used interchangeably with 'Auto Focus (AF)'.

The "image stabilization function" used below is defined as a function of moving or tilting a lens module in a direction perpendicular to the optical axis direction so as to cancel a vibration (movement) generated in an image sensor by an external force. Meanwhile, "image stabilization" may be used interchangeably with "optical image stabilization (OIS)".

Hereinafter, one of a driving magnet 400 and a sensing magnet 150 may be referred to as a 'first magnet' and the other as a 'second magnet'.

Hereinafter, the present invention will be described in more detail according to the accompanying drawings.

Figure 2:
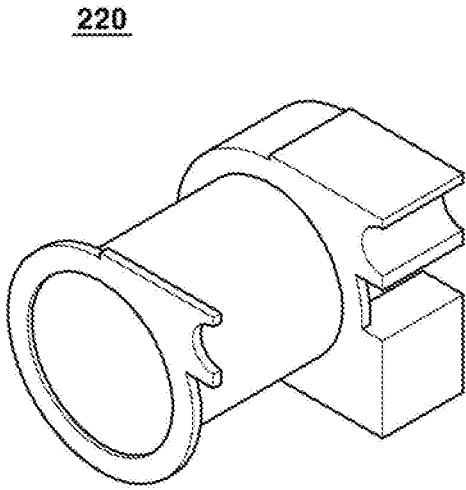
FIG. 2 is a perspective view of a bobbin according to an embodiment of the present invention.
Figure 3:
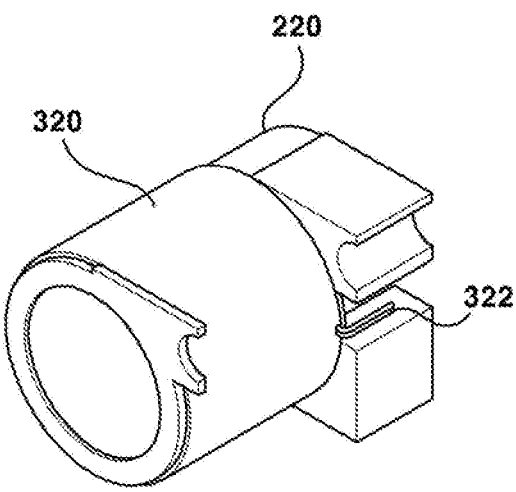
FIG. 3 is a perspective view of a bobbin in which coils are disposed according to an embodiment of the present invention.
Figure 4:
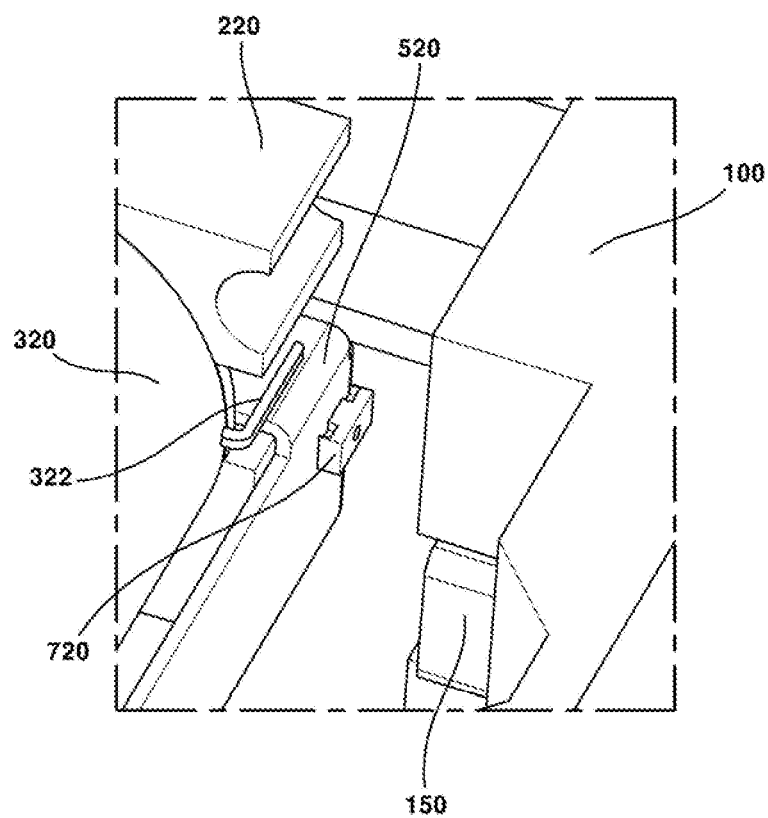
FIG. 4 is an enlarged view of portion A of FIG. 1.
Figure 5:
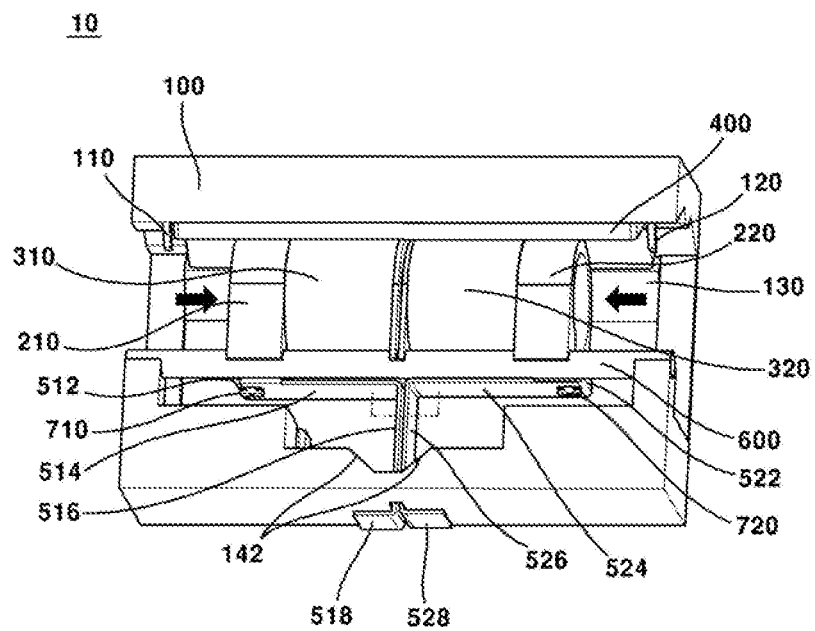
FIGS. 5 and 6 are operation diagrams of a lens driving device according to an embodiment of the present invention.
Figure 6:
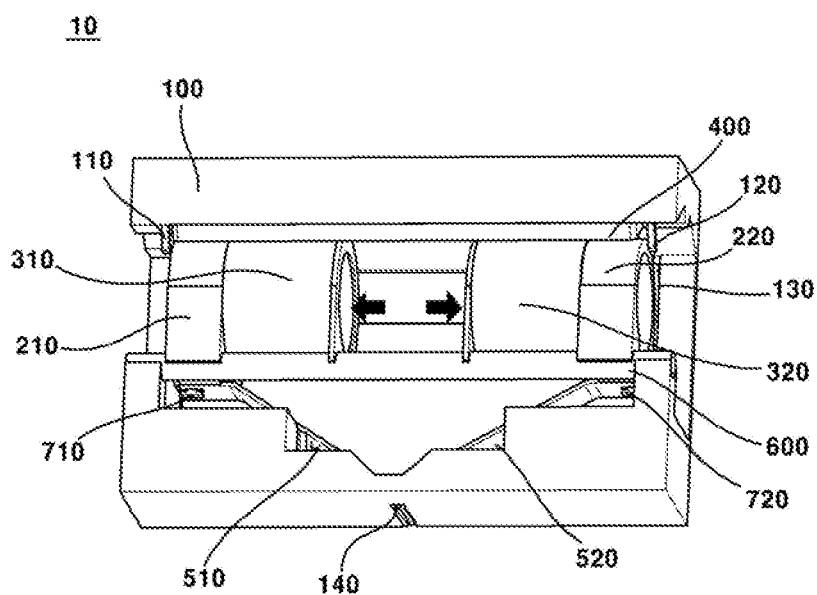

FIG. 1 is a perspective view of a lens driving device according to an embodiment of the present invention; FIG. 2 is a perspective view of a bobbin according to an embodiment of the present invention; FIG. 3 is a perspective view of a bobbin in which coils are disposed according to an embodiment of the present invention; FIG. 4 is an enlarged view of portion A of FIG. 1; and FIGS. 5 and 6 are operation diagrams of a lens driving device according to an embodiment of the present invention.

Referring to FIGS. 1 to 4, a lens driving device 10 according to an embodiment of the present invention comprises: a base 100; bobbins 210 and 220; coils 310 and 320; a driving magnet 400; flexible printed circuit boards (FPCBs) 510 and 520; a shaft 600; position detection sensors 710 and 720; and a sensing magnet 150, and it may be implemented except for some of the components, and additional components are not excluded.

Referring FIGS. 1 to 4, the camera module according to an embodiment of the present invention may comprise a lens driving device 10. At this time, the camera module may comprise a lens module (not shown) disposed on the bobbins 210 and 220. The lens module may comprise a first lens module disposed on the first bobbin 210 and a second lens module disposed on the second bobbin 220.

The lens driving device may be a voice coil motor (VCM).

The base 100 may comprise a center hole passing through the optical axis of the lens.

The center hole may be disposed with bobbins 210 and 220, coils 310 and 320, a driving magnet 400, flexible printed circuit boards 510 and 520, a shaft 600, position detection sensors 710 and 720, and a sensing magnet 150.

The inner side surface of the base 100 may be formed in a shape corresponding to the shape of the driving magnet 400. The driving magnet 400 may be fixedly installed on the inner side surface of the base 100 formed in a shape corresponding to the shape of the driving magnet 400. The driving magnet 400 may be fixed to the inner side surface of the base 100 by a method such as adhesion and the like.

The base 100 may comprise stoppers 110 and 120 formed to be protruded from the area of the base 100 adjacent to both side surfaces of the driving magnet 400 that are fixedly installed on the inner side surface to the interior of the base 100. At this time, the stoppers 110 and 120 may comprise a first stopper 110 formed on one side of the driving magnet 400 and a second stopper 120 formed on the other side of the driving magnet 400. The first stopper 110 limits the movement of a first bobbin 210, which will be described later, and the second stopper 120 limits the movement of a second bobbin 220, which will be described later, and thereby the escape of the first and second bobbins 210 and 220 due to defects can be prevented. However, if the movement of the first and second bobbins 210 and 220 can be restricted, the number and position of the stoppers 110 and 120 may be variously changed.

The base 100 may comprise a guide portion 130 formed on the inner side surface of the base 100 in a shape corresponding to the shape of the bobbins 210 and 220. The guide portion 130 is in contact with at least a portion of the bobbins 210 and 220, the area of the guide portion 130 to be contacted may have the same curvature as the outer side surface of the bobbins 210 and 220. At this time, the bobbins 210 and 220 may be sliding in contact with the guide portion 130.

The base 100 may comprise a support base on which a shaft 600, which will be described later is disposed. The support base may comprise a first support base and a second support base. At this time, the first support base and the second support base may be positioned to face each other in the optical axis direction so that the shaft 600 can be in contact with the bobbins 210 and 220.

The base 100 may comprise a hole 140 being passed through by flexible printed circuit boards 510 and 520, which will be described later. At this time, although it is preferred that the hole 140 is located in a direction spaced apart from the driving magnet 400 with respect to the optical axis of the lens, so that the electromagnetic interference (EMI) that may occur between flexible printed circuit boards 510 and 520 and driving magnet 400, the position of the hole 140 being passed through by the flexible printed circuit boards 510 and 520 is not limited thereto and may be variously changed. Although the cross-section of the hole 140 is illustrated in the shape of a rectangle, the cross-sectional shape of the hole 140 may be variously changed without being limited to this as long as the flexible printed circuit boards 510 and 520 can be passed through.

Referring to FIG. 5, the hole 140 of the base 100 may comprise a tapered surface 142 which becomes wider as it travels toward the direction of the optical axis of the lens, the bobbin 210 and 220 or the inside of the base 100. The tapered surface 142 may be formed to have a predetermined angle with the outer side surface of the base 100 when the first bobbin 210 and the second bobbin 220 are getting away (from each other), so that the displacement of the first and second flexible printed circuit boards 510 and 520 cab be limited without being interfered with the first and second flexible printed circuit boards 510 and 520 connected to the first and second bobbins 210 and 220. This will be described in detail later.

The bobbins 210 and 220 may comprise first bobbin 210 and second bobbin 220. At this time, the first and second bobbins 210 and 220 may be disposed in a center hole formed in the base 100. At least a portion of the first and second bobbins 210 and 220 may be disposed adjacent to the driving magnet 400 or spaced apart by a predetermined distance. The first and second bobbins 210 and 220 may be movably connected to the base 100. Specifically, through the shaft 600, which will be described later, it can be slid in the optical axis direction of the lens.

The first and second bobbins 210 and 220 may comprise a center hole. The center hole may pass through the first and second bobbins 210 and 220 in the optical axis direction of the lens. A lens module may be coupled to the center hole of the first and second bobbins 210 and 220. The lens module may comprise at least one lens. At this time, the lens may be made of a synthetic resin material, a glass material or a quartz material, but is not limited thereto and may be made of various materials. In addition, the lens may comprise an aspherical lens. In addition, the lens module may comprise a lens and a lens barrel surrounding the lens. The first and second bobbins 210 and 220 and the lens may be coupled by screw-coupling and/or an adhesive. For an example, threads corresponding to threads formed on the outer circumferential surface of the lens may be disposed on the inner circumferential surfaces of the first and second bobbins 210 and 220 forming the center hole. The adhesive that couples the first and second bobbins 210 and 220 with the lens may be an epoxy that is being cured by any one or more of ultraviolet (UV), heat and laser.

The first and second bobbins 210 and 220 may comprise coil coupling portions. First and second coils 310 and 320 may be coupled to the coil coupling portions. The coil coupling portion may comprise a groove formed in a way that a portion of the outer side surfaces of the first and second bobbins 210 and 220 is being recessed. At this time, the first and second coils 310 and 320 may be accommodated in the groove of the coil coupling portion. The coil coupling portion may be integrally formed with the outer circumferential surfaces of the first and second bobbins 210 and 220.

The coils 310 and 320 may comprise a first coil 310 and a second coil 320. The first coil 310 may be directly wound on the outer circumferential surface of the first bobbin 210, and the second coil 320 may be wound directly on the outer circumferential surface of the second bobbin 220. At this time, the first coil 310 may be directly wound on the coil coupling portion of the first bobbin 210, and the second coil 320 may be directly wound on the coil coupling portion of the second bobbin 220. Or, the first and second coils 310 and 320 may be coupled to the first and second bobbins 210 and 220 in a directly wound state. The first coil 310 may be disposed between the first bobbin 210 and the base 100, and the second coil 320 may be disposed between the second bobbin 220 and the base 100.

The first and second coils 310 and 320 may be faced with a driving magnet. The first and second coils 310 and 320 may be moved through the electromagnetic interaction with the driving magnet 400. At this time, the first and second coils 310 and 320 may be moved in the same direction or different directions depending on the direction of the current applied to the first and second coils 310 and 320. When the first and second coils 310 and 320 are moved, the lens module may also be moved integrally. Meanwhile, the first and second coils 310 and 320 may be moved when driving AF. At this time, the first and second coils 310 and 320 may be referred to as an 'AF coil'. However, the first and second coils 310 and 320 may be moved even when driving OIS.

The coils 310 and 320 may comprise lead wires 322 for supplying power. At this time, the lead wires 322 may be electrically connected to flexible printed circuit boards 510 and 520.

The driving magnet 400 is fixedly installed in the base 100 and faces the first and second coils 310 and 320. The driving magnet 400 may be disposed between the base 100 and the bobbins 210 and 220 on which the coils 310 and 320 are wound. The driving magnet 400 may be fixed to the inner side surface of the base 100 by an adhesive. The driving magnet 400 may electromagnetically interact with the coils 310 and 320. The driving magnet 400 can be used in common for driving AF and driving OIS. In the embodiment of the present invention, the driving magnet 400 is illustrated in the shape of a plate having a certain curvature, but is not limited thereto, and the shape of the driving magnet 400 may be variously changed.

The length of the driving magnet 400 may be greater than the sum of the lengths of the first bobbin 210 and second bobbin 220. For example, the length of the driving magnet 400 may be equal to the sum of the lengths of the first bobbin 210 and the second bobbin 220. Unlike this, referring to FIG. 6, when the first bobbin 210 and the second bobbin 220 are spaced apart farthest from each other, the length of the driving magnet 400 may be greater than or equal to the sum of the separation distance between the first bobbin 210 and the second bobbin 220 and the lengths of the first and second bobbins 210 and 220. When the first bobbin 210 and the second bobbin 220 are spaced apart farthest from each other, the length of the driving magnet 400 may be greater than or equal to the sum of the separation distance between the first bobbin 210 and the second bobbin 220 and the lengths of the first and second coils 310 and 320.

The flexible printed circuit board may comprise a first flexible printed circuit board 510 and a second flexible printed circuit board 520. At this time, one end of the first flexible printed circuit board 510 is electrically connected to the first coil 310, and the other end may pass through the hole 140 of the base 100. One end of the second flexible printed circuit board 520 is electrically connected to the second coil 320, and the other end may pass through the hole 140 of the base 100.

The flexible printed circuit boards 510 and 520 may be electrically connected to the driving magnet 400. Unlike this, the driving magnet 400 may be supplied with power from a separately provided power source. The flexible printed circuit boards 510 and 520 may be electrically connected to the position detection sensors 710 and 720. The flexible printed circuit boards 510 and 520 may comprise terminals for supplying power to the coils 310 and 320, the driving magnet 400, and the position detection sensors 710 and 720. A portion of the terminal portion may be exposed outside. The terminal portion and the position detection sensors 710 and 720 may be coupled with flexible printed circuit boards 510 and 520 through soldering.

The flexible printed circuit boards 510 and 520 are bent in part so that the space efficiency can be enhanced. This will be described in detail in the operation of the lens driving device 10. The first flexible printed circuit board 510 comprises a bent portion disposed on the groove of the first bobbin 210. The first coil 310 is coupled to the bent portion of the first flexible printed circuit board 510.

The shaft 600 may be installed in the base 100. The shaft 600 may be formed to be extended in the direction of the optical axis of the lens. At this time, one end of the shaft 600 is coupled to one side of the base 100, and the other end of the shaft 600 may be coupled to the other side of the base 100. The shaft 600 and the base 100 may be coupled by an adhesive or the like.

The shaft 600 may be connected to bobbins 210 and 220. Specifically, at least some of the shaft 600 may be accommodated in penetrating grooves provided in the bobbins 210 and 220. At this time, the first and second bobbins 210 and 220 are connected to the shaft 600 and can be slid. In one embodiment of the present invention, only one shaft is illustrated, but may be formed of a plurality of shafts. At this time, the plurality of shafts may be disposed spaced apart from each other.

In one embodiment of the present invention, the shaft 600 is described as an example that is formed in the shape of a cylinder, but is not limited thereto, and the shape of the shaft 600 may be variously changed.

Position detection sensors 710 and 720 may comprise a first position detection sensor 710 and a second position detection sensor 720. The first position detection sensor 710 may be disposed on the first flexible printed circuit board 510 and the second position detection sensor 720 may be disposed on the second flexible printed circuit board 520. The sensing magnet 150 may be disposed between the flexible printed circuit boards 510 and 520 and the base 100. The position detection sensors 710 and 720 may face the sensing magnet 150. The position detection sensors 710 and 720 may detect a signal from the sensing magnet 150 to detect the movement of the bobbins 210 and 220 in the optical axis direction. The position detection sensors 700 and 720 may detect the amount of movement in the optical axis direction of the bobbins 210 and 220 and provide them to the control unit in real time. The first position detection sensor 710 may be the first sensor. The second position detection sensor 720 may be the second sensor. The first sensor may be coupled to the first flexible printed circuit board 510 and sense the first sensing magnet. The second sensor may be coupled to the second flexible printed circuit board 520 and sense the second sensing magnet.

The lens driving device 10 may further comprise a control unit. The control unit may be disposed on the flexible printed circuit boards 510 and 520. The control unit individually controls the direction, intensity, and amplitude of the current supplied to the coils 310 and 320 and/or the driving magnet 400, and thereby an autofocus function and/or an image stabilization function can be performed.

Hereinafter, the operation of the lens driving device 10 according to an embodiment of the present invention will be described.

The coils 310 and 320 and the driving magnet 400 may be interacted with each other electromagnetically. When a current is supplied to the coils 310 and 320 to form an electromagnetic field around the coils 310 and 320, the coils 310 and 320 may be moved with respect to the driving magnet 400 by the electromagnetic interaction between the coils 310 and 320 and the driving magnet 400.

Referring to FIG. 5, the first bobbin 210 and the second bobbin 220 are getting close to each other by the electromagnetic interaction between the driving magnet 400 and the coils 310 and 320.

At this time, a first flexible printed circuit board 510 may comprise a first connection portion 514 formed to be extend from one end 512 of the first flexible printed circuit board 510, and a second connection portion 516 formed to be extended from the other end 518 of the first flexible printed circuit board 510. A second flexible printed circuit board 520 may comprise a third connection portion 524 extending from one end 522 of the second flexible printed circuit board 520, and a fourth connection portion 526 formed to be extended from the other end 528 of the second flexible printed circuit board 520

The angle formed by the first connection portion 514 and the second connection portion 516 when the first bobbin 210 and the second bobbin 220 are getting close to each other and the first bobbin 210 and the second bobbin 220 are in contact or close enough to be in contact with each other, the angle formed by the first connection portion 514 and the second connection portion 516 is 90 degrees, and the angle formed by the third connection portion 526 and the fourth connection portion 528 may be 90 degrees. At this time, a portion in which the first connection portion 514 and the second connection portion 516 are continued, and a portion in which the third connection portion 526 and the fourth connection portion 528 are continued may be formed with folding lines in advance.

When the first bobbin 210 and the second bobbin 220 are getting close to each other, the other end 518 of the first flexible printed circuit board 510 and the other end 528 of the second flexible printed circuit board 520 may be exposed toward the outside of the base 100. At this time, the other end 518 of the first flexible printed circuit board 510 and the other end 528 of the second flexible printed circuit board 520 may be in contact with the outer side surface of the base 100.

When the first bobbin 210 and the second bobbin 220 are getting close to each other, the first connection portion 514 and the third connection portion 524 are located on a straight line in the optical axis direction, and the second connection portion 516 and the fourth connection portion 526 are in contact with each other or close enough to be in contact with each other.

Referring to FIG. 6, the first bobbin 210 and the second bobbin 220 are spaced apart from each other by electromagnetic interaction between the driving magnet 400 and the coils 310 and 320. At this time, the distance that the first bobbin 210 and the second bobbin 220 can be spaced apart from each other is limited by the stoppers 110 and 120, or by the interaction between the base 100 and the other ends 518 and 528 of the flexible printed circuit boards 510 and 520. At this time, the base 100 may comprise a separate stopper that limits the movement of the other ends 518 and 528 of the flexible printed circuit boards 510 and 520.

When the first bobbin 210 and the second bobbin 220 are getting away from each other, the distance between the first flexible printed circuit board 510 and the second flexible printed circuit board 520 is also increased. If the first bobbin 210 and the second bobbin 220 are spaced apart farthest from each other, a portion of the first flexible printed circuit board 510 and a portion of the second flexible printed circuit board 520 may be in contact with a tapered surface 142 of the base 100.

The autofocus function of the lens driving device 10 according to the present embodiment will be described. When a power is supplied to the coils 310 and 320, the coils 310 and 320 perform movement with respect to the driving magnet 400 by the electromagnetic interaction between the driving magnet 400 and the coils 310 and 320. At this time, the bobbins 210 and 220 to which the coils 310 and 320 are coupled are being moved integrally with the coils 310 and 320. That is, the bobbins 210 and 220 to which the lens module is coupled are being moved in the optical axis direction with respect to the base 100. Such movement of the bobbins 210 and 220 results in the movement of the lens module to be closer to or farther away from the image sensor, so that focus adjustment on the subject can be performed. Meanwhile, the aforementioned focus adjustment may be automatically performed in accordance with the distance of the subject.

In the lens driving device 10 according to the present embodiment, auto focus feedback control may be performed for more precise realization of the auto focus function. The position detection sensors 710 and 720 located on the flexible printed circuit boards 510 and 520 detect the magnetic field of the sensing magnet 150 disposed on the base 100. Accordingly, when the bobbins 210 and 220 perform relative movement with respect to the base 100, the amount of magnetic fields detected by the position detection sensors 710 and 720 is changed. The position detection sensors 710 and 720 detect the amount of movement of the bobbins 210 and 220 in the optical axis direction or the location of the bobbins 210 and 220 in this way and transmit a detection value to the control unit. The control unit determines whether to perform an additional movement for the bobbins 210 and 220 through the received detection value. Since such a process occurs in real time, the auto focus function of the lens driving device 10 according to the present embodiment can be performed more precisely through the auto focus feedback control.

In addition, the lens driving device 10 according to an embodiment of the present invention can use the driving magnet 400 for driving AF and driving OIS at the same time, so that the miniaturization of the product can be realized through the enhancement of the space efficiency.

In addition, since the bobbins 210 and 220 can be moved with a single shaft 600 via the guide portion 130, the frictional force that may occur between the shaft 600 and the bobbins 210 and 220 and the wear of the product can be minimized.

Although exemplary embodiments of the present invention have been described above with reference to the accompanying drawings, those skilled in the art to which the present invention belongs may understand that the present invention can be implemented into other specific forms without changing the technical spirit or essential features thereof. Therefore, it should be understood that the exemplary embodiments described above are exemplary in all respects and not restrictive.

The invention claimed is:

1. A lens driving device comprising:
    a base comprising a hole;
    a first bobbin disposed in the base;
    a second bobbin disposed in the base and spaced apart from the first bobbin;
    a first coil disposed on the first bobbin;
    a second coil disposed on the second bobbin;
    a driving magnet fixed to the base and facing the first coil and the second coil;
    a first flexible printed circuit board comprising one end electrically connected to the first coil and an other end passing through the hole of the base;
    a second flexible printed circuit board comprising one end electrically connected to the second coil and an other end passing through the hole of the base;
    a control unit, disposed on the first flexible printed circuit board and the second flexible printed circuit board, the control unit being configured to individually control direction, intensity, and amplitude of a current supplied to the first coil, the second coil or the driving magnet; and
    a first position detection sensor and a second position detection sensor, disposed on the first flexible printed circuit board and the second flexible printed circuit board, respectively, the first position detection sensor being configured to detect an amount of movement in an optical axis direction of the first bobbin in real time and the second position detection sensor being configured to detect an amount of movement in the optical axis direction of the second bobbin in real time, and the first position detection sensor and the second position detection sensor each being configured to send the respective detected values to the control unit, wherein the control unit is further configured to determine whether to perform an additional movement for the first bobbin and the second bobbin through the detected values, wherein the first flexible printed circuit board comprises a first connection portion formed to be extended from the one end of the first flexible printed circuit board, and a second connection portion formed to be extended from the other end of the first flexible printed circuit board, wherein the second flexible printed circuit board comprises a third connection portion formed to be extended from the one end of the second flexible printed circuit board, and a fourth connection portion formed to be extended from the other end of the second flexible printed circuit board, wherein an angle formed by the first connection portion and the second connection portion and an angle formed by the third connection portion and the fourth connection portion changes according to the movement of the first bobbin and the second bobbin, and wherein, in the optical axis direction, a length of the driving magnet is greater than a sum of a length of the first bobbin and a length of the second bobbin.

2. The lens driving device of claim 1, further comprising a shaft connected to the base, wherein the first bobbin and the second bobbin are configured to slide along the shaft.

3. The lens driving device of claim 2, wherein each of the first bobbin and the second bobbin comprise a groove in which the shaft is disposed.

4. The lens driving device of claim 1, wherein the base is formed in a shape corresponding to a portion of the first and second bobbins, and comprises a guide portion contacted with a portion of the first and second bobbins to guide a movement of the first and second bobbins.

5. The lens driving device of claim 1, wherein the hole of the base comprises a tapered surface that becomes wider as it goes toward an inside of the base.

6. The lens driving device of claim 5, wherein, when the first bobbin and the second bobbin are at their furthest distance from each other, the first flexible printed circuit board and the second flexible printed circuit board are in contact with the tapered surface.

7. The lens driving device of claim 1, wherein the base comprises a first stopper formed to be protruded from an area adjacent to one end of the driving magnet and limiting a movement of the first bobbin, and a second stopper formed to be protruded from an area adjacent to the other end of the driving magnet and limiting a movement of the second bobbin.

8. The lens driving device of claim 1, wherein the first coil is wound along an outer circumferential surface of the first bobbin, and the second coil is wound along an outer circumferential surface of the second bobbin.

9. The lens driving device of claim 1, further comprising first and second sensing magnets disposed on the base, wherein the first position detection sensor is configured to sense the first sensing magnet, and wherein the second position detection sensor is configured to sense the second sensing magnet.

10. The lens driving device of claim 1, wherein the first flexible printed circuit board comprises a portion disposed outside the base, the second connection portion connecting the first connection portion and the portion disposed outside the base, and wherein the second connection portion passes through the hole of the base.

11. The lens driving device of claim 10, wherein the first connection portion and the second connection portion form a right angle or an obtuse angle, and wherein the portion outside the base and the second connection portion form a right angle or an acute angle.

12. The lens driving device of claim 1, wherein the first bobbin comprises a groove, wherein the first flexible printed circuit board comprises a bent portion disposed on the groove of the first bobbin, and wherein the first coil is coupled to the bent portion of the first flexible printed circuit board.

13. A lens driving device comprising:

a base;

a first bobbin disposed in the base;

a second bobbin disposed in the base;

a driving magnet disposed in the base;

a first coil moving the first bobbin by an electromagnetic interaction with the driving magnet;

a second coil moving the second bobbin by an electromagnetic interaction with the driving magnet;

a first flexible printed circuit board comprising one end disposed in the base and electrically connected to the first coil, and an other end disposed outside the base;

a second flexible printed circuit board comprising one end disposed in the base and electrically connected to the second coil, and an other end disposed outside the base;

a control unit, disposed on the first flexible printed circuit board and the second flexible printed circuit board, the control unit being configured to individually control direction, intensity, and amplitude of a current supplied to the first coil, the second coil or the driving magnet; and a first position detection sensor and a second position detection sensor, disposed on the first flexible printed circuit board and the second flexible printed circuit board, respectively, the first position detection sensor configured to detect an amount of movement in an optical axis direction of the first bobbin in real time and the second position detection sensor configured to detect an amount of movement in the optical axis direction of the second bobbin in real time, and the first position detection sensor and the second position detection sensor each being configured to send the respective detected values to the control unit, wherein the control unit is further configured to determine whether to perform an additional movement for the first bobbin and the second bobbin through the detected values, wherein the first flexible printed circuit board comprises a first connection portion formed to be extended from the one end of the first flexible printed circuit board, and a second connection portion formed to be extended from the other end of the first flexible printed circuit board, wherein the second flexible printed circuit board comprises a third connection portion formed to be extended from the one end of the second flexible printed circuit board, and a fourth connection portion formed to be extended from the other end of the second flexible printed circuit board, wherein an angle formed by the first connection portion and the second connection portion and an angle formed by the third connection portion and the fourth connection portion changes according to the movement of the first bobbin and the second bobbin, and wherein, in the optical axis direction, a length of the driving magnet is greater than a sum of a length of the first bobbin and a length of the second bobbin.

14. The lens driving device of claim 13, wherein the base comprises a hole, and wherein each of the first and second flexible printed circuit boards passes through the hole of the base.

15. The lens driving device of claim 13, wherein the one end of the first flexible printed circuit board is configured to move along with the first bobbin, and wherein the other end of the first flexible printed circuit board is maintained to be disposed outside the base when the first bobbin moves.

16. The lens driving device of claim 13, wherein the first coil is disposed on the first bobbin, wherein the second coil is disposed on the second bobbin, and wherein the driving magnet is fixed to the base and faces the first coil and the second coil.

17. A camera module comprising:
a base comprising a hole;
a first bobbin disposed in the base;
a second bobbin disposed in the base and spaced apart from the first bobbin;
a first lens module disposed on the first bobbin;
a second lens module disposed on the second bobbin;
a first coil disposed on the first bobbin;
a second coil disposed on the second bobbin;
a driving magnet fixed to the base and facing the first coil and the second coil;
a first flexible printed circuit board comprising one end electrically connected to the first coil and an other end passing through the hole of the base;
a second flexible printed circuit board comprising one end electrically connected to the second coil and an other end passing through the hole of the base;
a control unit, disposed on the first flexible printed circuit board and the second flexible printed circuit board, the control unit being configured to individually control direction, intensity, and amplitude of a current supplied to the first coil, the second coil or the driving magnet; and
a first position detection sensor and a second position detection sensor, disposed on the first flexible printed circuit board and the second flexible printed circuit board, respectively, the first position detection sensor configured to detect an amount of movement in an optical axis direction of the first bobbin in real time and the second position detection sensor configured to detect an amount of movement in the optical axis direction of the second bobbin in real time, and the first position detection sensor and the second position detection sensor each being configured to send the respective detected values to the control unit, wherein the control unit is further configured to determine whether to perform an additional movement for the first bobbin and the second bobbin through the detected values, wherein the first flexible printed circuit board comprises a first connection portion formed to be extended from the one end of the first flexible printed circuit board, and a second connection portion formed to be extended from the other end of the first flexible printed circuit board, wherein the second flexible printed circuit board comprises a third connection portion formed to be extended from the one end of the second flexible printed circuit board, and a fourth connection portion formed to be extended from the other end of the second flexible printed circuit board, wherein an angle formed by the first connection portion and the second connection portion and an angle formed by the third connection portion and the fourth connection portion changes according to the movement of the first bobbin and the second bobbin, and wherein, in the optical axis direction, a length of the driving magnet is greater than a sum of a length of the first bobbin and a length of the second bobbin.

* * * * *